Sept. 6, 1966  B. A. G. BJERNEKULL  3,271,224
METHOD OF MANUFACTURING HOLLOW BODIES HAVING
WALLS OF SANDWICH CONSTRUCTION
Filed Feb. 13, 1963  4 Sheets-Sheet 1
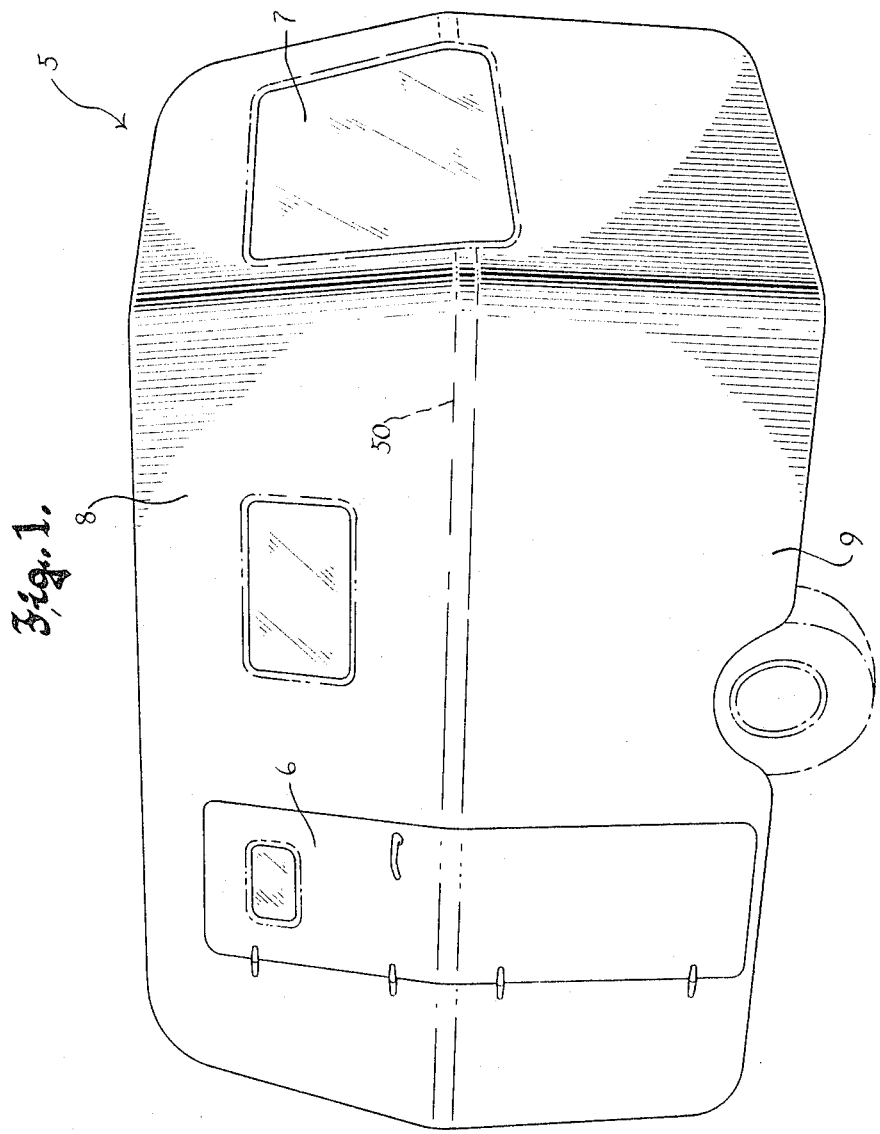
Inventor
Bo Axel Gunnar Bjernekull

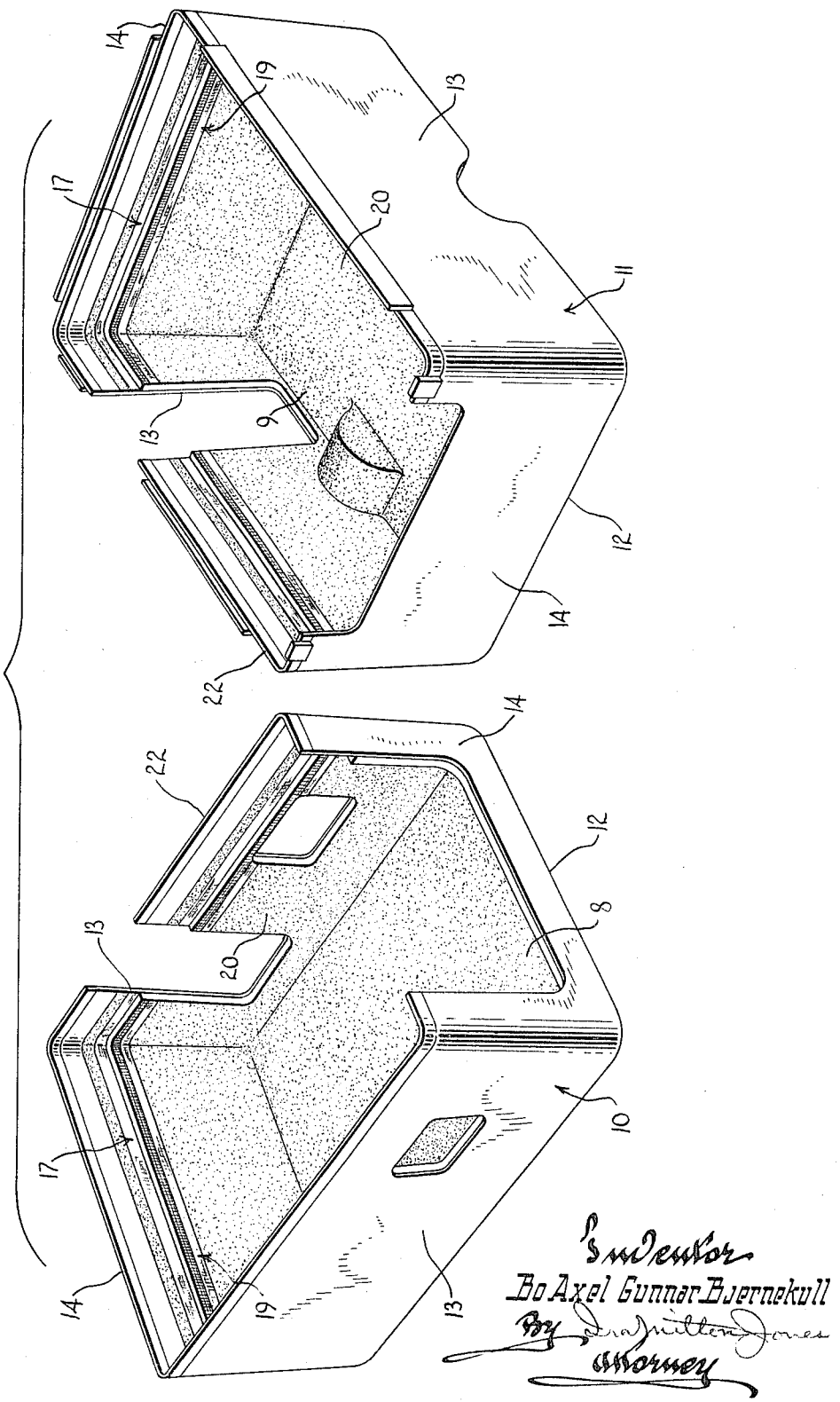

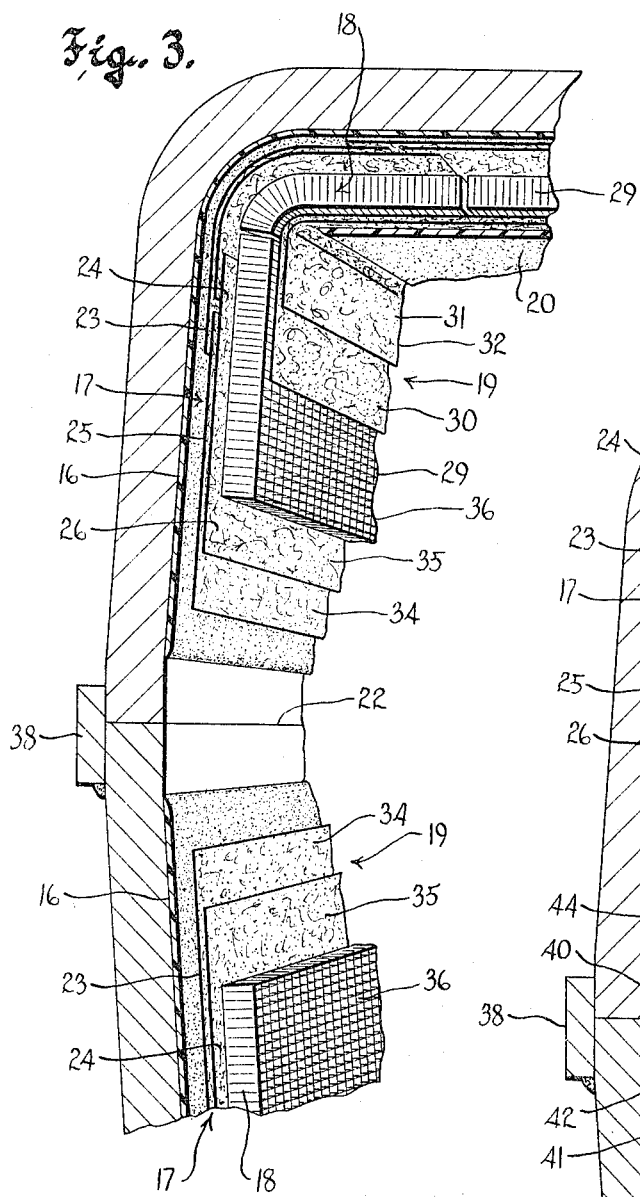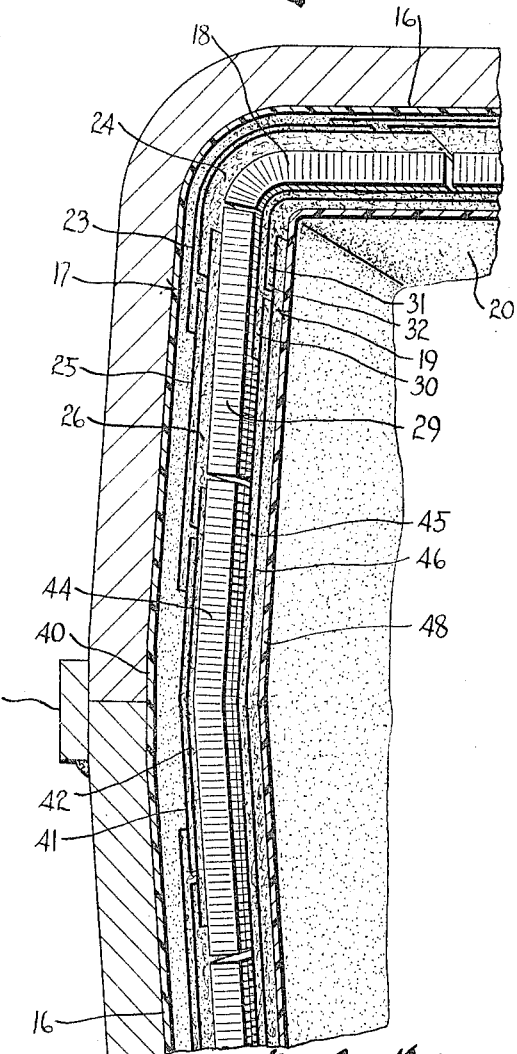

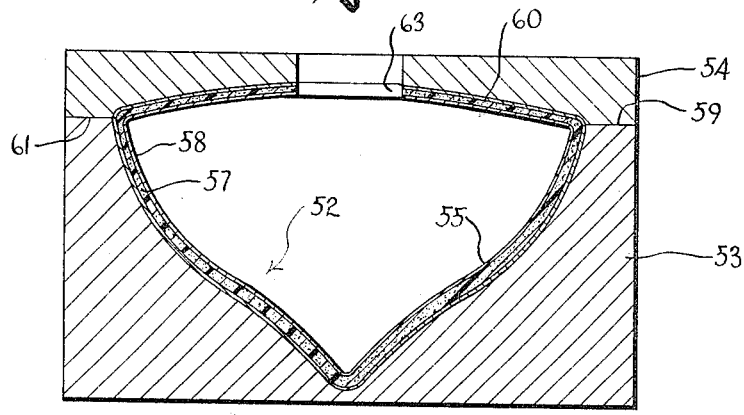
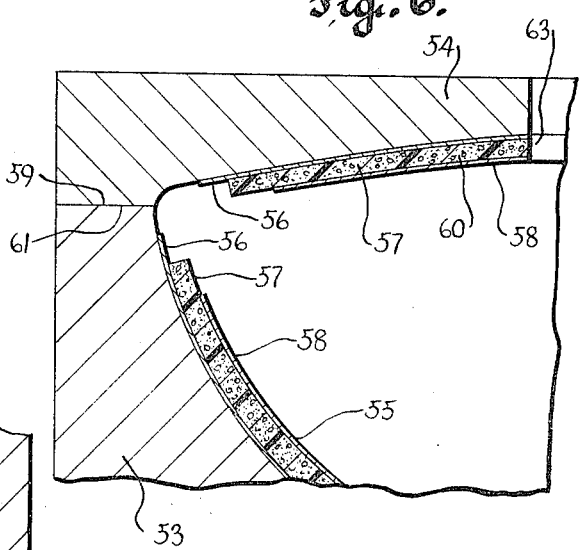
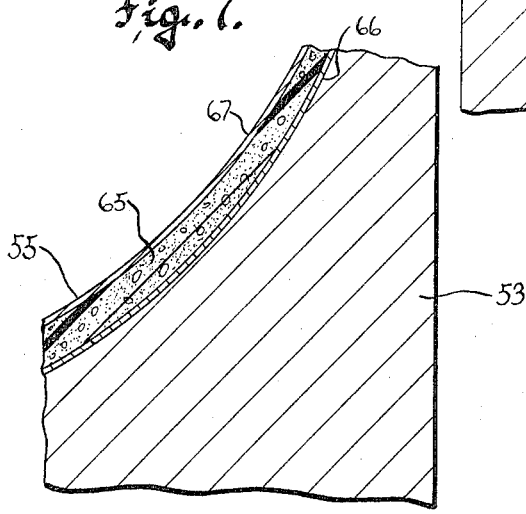

United States Patent Office 3,271,224
Patented Sept. 6, 1966

3,271,224
METHOD OF MANUFACTURING HOLLOW BODIES HAVING WALLS OF SANDWICH CONSTRUCTION
Bo Axel Gunnar Bjernekull, Norrkoping, Sweden, assignor to Saab Aktiebolaget, a corporation of Sweden
Filed Feb. 13, 1963, Ser. No. 258,270
3 Claims. (Cl. 156—245)

This invention relates to an improved method of making hollow bodies having walls of sandwich construction.

Hollow bodies of the type with which this invention is concerned are made with complementary body parts having walls comprising a core of cellular material confined between and bonded to inner and outer layers of glass fiber reinforcements.

This necessitates the formation of a joint between the free edge portions of the complementary body parts.

The object of this invention is to provide a method of manufacturing hollow bodies having walls of sandwich construction, which involves making the body in complementary sections, and wherein the various wall forming components of the body parts are so formed that the free edges of the body parts can be integrated entirely without producing an unsightly joint and without detracting from the strength of the finished body.

Another object of this invention is to provide a method of integrating the free edges of complementary parts of a hollow body having walls of sandwich construction, to provide a joint or zone of integration between edge portions of the separately formed body parts, whereby the wall of the body in said zone of integration has the same type of sandwich structure as the remainder of the body, smoothly blends with adjacent wall portions of the complementary body parts, and has the same strength as the remaining wall portions of the body.

With these and other objects in view which will appear as the description proceeds, this invention resides in the novel method substantially as hereinafter described and more particularly defined by the appended claims, it being understood that such changes in the precise embodiment of the hereindisclosed invention may be made as come within the scope of the claims.

The accompanying drawings illustrate several complete examples of the practice of the method of this invention and in which:

FIGURE 1 is a perspective view of a hollow body made in accordance with the method of this invention, the body here shown being that of an enclosed two-wheel trailer;

FIGURE 2 is a separated perspective view of the complementary body parts, which together form the body shown in FIGURE 1, illustrating the same in the molds in which they are separately formed;

FIGURE 3 is an enlarged cross sectional view through the formed up complementary body parts showing how the molds are utilized to hold the same in the positions they are to occupy in the finished body, and prior to integration of their free edge portions;

FIGURE 4 is a view similar to FIGURE 3 showing the manner in which the free edge portions of the body parts are integrated while still in their respective molds;

FIGURE 5 is a cross sectional view illustrating how the method of this invention can be practiced for the construction of boat hulls;

FIGURE 6 is an enlarged fragmentary cross section similar to FIGURE 5, but before integration of the deck and hull; and FIGURE 7 is an enlarged fragmentary cross sectional view illustrating how the core of the boat hull can be thickened toward the bottom of the hull for greater strength.

Referring now more particularly to the accompanying drawings in which like reference characters have been applied to like parts throughout the views, the numeral 5 in FIGURE 1 generally designates an enclosed two-wheel trailer of the type that is adapted to be draft coupled with the rear of an automotive vehicle or the like, and having a body made in accordance with the method of this invention. As will appear in greater detail hereinafter, the method of this invention is best adapted for the production of hollow bodies having at least one opening in one of its walls, which as shown in FIGURE 1 may be either the opening for a door 6 or that for one or more windows 7.

The body 5 is made from two complementary body parts, namely an upper body part 8 and a lower body part 9. The numerals 10 and 11, respectively designate top and bottom mold halves in which the top and bottom body parts 8 and 9, respectively, are separately formed. Each mold half has a substantially plane bottom 12 and somewhat outwardly sloping side walls 13 and similarly outwardly slanted end walls 14.

The two mold halves are connectible with one another with their open sides facing each other to form a hollow mold, the inner contour of which corresponds to the outer contour of the finished body seen in FIGURE 1. As will be appreciated, of course, the mold halves are provided with suitable cut-out wall parts which correspond to the door openings and window openings in the trailer body. At least one of such openings in the closed mold provides access to its interior.

In carrying out the method of this invention, the two mold halves are separated and laid with their open sides facing upwardly as seen in FIGURE 2, and the top and bottom body parts 8 and 9 are separately formed in the respective mold halves 10 and 11. The inner surfaces of both mold halves are first treated with a suitable substance to render them non-adhering to curing and bonding resins, and which may comprise a light coating of wax, following which the building up of the two body parts 8 and 9 may occur simultaneously in the separate mold parts. Each body part is preferably, although not necessarily, built up from the bottom of its mold part, toward and along the sides thereof, in the following manner.

A coating of colored curing resin 16 is first applied to the waxed inner surfaces of the mold halves, as by painting or spraying the resin thereon. Onto the curing or bonding resin 16 there are successively laid down a glass fiber reinforcement generally designated 17, a core 18 of lightweight cellular material, an inner glass fiber reinforcement generally designated 19, and finally a finish coating 20 of colored curing or bonding resin similar to the coating 16. The fiber glass reinforcements 17 and 19 together with their adjacent resin coatings 16 and 20, respectively, constitute the outer and inner sandwich layers of the body wall, and the core 18 is confined between and bonded to said layers.

When applying the outer coating of resin 16 to the waxed interior surfaces of each of the mold halves, the spraying or painting on of the resin is terminated a distance from the free edge 22 of each of the mold halves as seen best in FIGURE 3. The outer reinforcement 17 may then be applied by laying down laminae of fiber glass mats which themselves may be first saturated with a curing resin before they are laid onto the resin coating 16.

The outer reinforcement or layer 17 comprises outer and inner laminae 23 and 24, respectively, comprised of overlapping mats of glass fiber impregnated and saturated with a curing or bonding resin. The outer lamination 23 consists of overlapping fiber glass mats 25, and the inner lamination 24 similarly consists of overlapped fiber glass mats 26. The mats of the two laminations are arranged with mats in close edge to edge relationship and with their end portions at such joints overlapped at each face thereof by the end portions of other mats.

Following the laying of the glass fiber mats that comprise the laminae 23 and 24 of the outer reinforcement 17, the core 18 is next applied onto their resin saturated surfaces. The core comprises slabs 29 of cellular or honeycomb material made of bitumen impregnated paper, available under the trade name of "Tvar-Wellit." These slabs, are laid in close edge to edge relationship, as indicated in FIGURE 3, with each edge to edge joint between slabs located substantial distances from the edges of the mats of the outer reinforcement 17, and covered by two such mats. The inner reinforcement 19 is laid down onto their exposed surfaces as the next step of the method.

In this case, also, the inner reinforcement comprises a pair of inner and outer laminations 30 and 31, respectively, each consisting of fiber glass mats 32 similar to and arranged in the same overlapping manner as the mats that form the outer reinforcement 17. The mats 32 may also be saturated with a curing or bonding resin before being laid down onto the cell slabs, and pairs of overlying mats extend across the edge to edge joints between the cell slabs onto which they are laid.

The finish coating 20 of colored curing resin may then be applied over the inner reinforcement 19.

During the placement of the cell slabs and mats for both the inner and outer reinforcements 17 and 19, it is important, as the free edge 22 of each mold is approached, to have the mats of the two reinforcements 17 and 19 and the cell slabs arranged as seen in FIGURE 3. As therein illustrated, the ends of the laminations comprising the reinforcements 17 and 19 and the core are all stepped in the same direction, inwardly away from the free edge 22 of the mold. Hence, the last laid mat 34 of the outer lamination 23 of the outer reinforcement is spaced farther from the free edge 22 of the mold section than the coating 16, while its flatwise adjacent overlying mat 35 is spaced still a greater distance from the free edge 22 of the mold half. Similarly, the cell slab 36 nearest the free edge 22 of the mold section should terminate a distance inwardly from the outer edge of the mat 35, while the mats of the inner and outer laminations forming the inner reinforcement 19 are respectively spaced greater distances away from the outer edge of the cell slab 36.

After the body parts are laid up in the manner described, the two mold halves are brought together to close the mold in the manner shown in FIGURE 3, wherein the free edge portions 22 of the mold halves are in abutting and registering engagement. They may be held in the desired positions of register by locating strips 38 secured to the exterior of one of the mold halves at its rim and overlying exterior portions of the other mold half.

The mold halves hold the two body parts therein with their free edge portions spaced from one another, and in the positions they are to occupy in the finished body. The free edge portions of the body parts may then be integrated in accordance with the method of this invention, by a person working from inside the closed mold, proceeding in the following manner.

The interior uncoated surfaces of the mold halves adjacent to their abutting edges 22 are first sprayed or coated with a colored curing resin as at 40 in FIGURE 4, after which outer integrating or spanning laminae are applied over the coating 40 all around the joint between the mold halves. These integrating laminae comprise overlying outer and inner laminations 41 and 42, respectively, consisting of glass fiber mats that are saturated with curing resin. The mats of the outer lamination 41 are of a size to flatwise overlap the free end portions of the mats 34 of outer reinforcement 17, so as to be in edge to edge relationship with their flatwise adjacent mats 35. Thereafter the inner spanning lamination 42 is applied over the lamination 41. The mats of which the inner spanning lamination is comprised are of a size to overlap the exposed end portions of the mats 35 of the outer reinforcement 17. Hence, opposite ends of the lamination 42 are disposed in edge-to-edge relationship with the outer edges of the core of cell slabs 36.

Spanning cell slabs 44 are then flatwise bonded to the inner lamination 42, in close edge-to-edge relation to the adjacent cell slabs 36 of the body parts, to complete the core.

Thereafter, a pair of integrating laminae comprising inner and outer laminations 45 and 46, respectively, each comprised of fiber glass mats suitably saturated with curing resin, are laid onto the inner faces of the cell slab 44, and over the uncovered surfaces of the adjacent cell slabs 36 as well as the exposed end portions of the mats 30 at the terminal edge portion of the inner reinforcement 19. It should be understood that the fiber glass mats which comprise the inner integrating lamination 45 are of a size to have opposite edges thereof disposed in near abutting relationship with the outer ends of the mats 31 at the terminal ends of the inner reinforcement 19, to thus flatwise overlap the entire exposed end portions of the mats 30 thereof. Similarly, the fiber glass mats which comprise the outer lamination 46 are of a size to completely overlie its inner lamination 45 and to extend onto and overlap the end portions of the mats 31 at the terminal ends of the inner reinforcement 19.

A final coating 48 of colored curing resin is thereafter applied to the integrating lamination 46 so as to become a part of the coating 20 applied to inner surfaces of the body parts previously.

Upon removal of the two mold halves from the hollow body thus built up, it will be apparent from an inspection of the finished body, both at its interior and its exterior, that its complementary body parts will have been integrated along a relatively narrow central band designated 50 by broken lines in FIGURE 1, that extends horizontally all around the body substantially medially of its top and bottom, and which band has surfaces that smoothly merge into the opposite surfaces of the body in a manner such as to enhance the appearance of the body.

One of the advantages in using honeycomb or core slabs of the cellular material described, is that they are elastically compressible in their plane to a substantial degree so that it is not necessary to cut the spanning slabs to exact dimensions when integrating the complementary body parts. This also assures that the spanning slabs will completely fill the spaces between the ends of the core in the body parts.

Also, since the glass fiber reinforcements comprise double thickness of mats overlying each of the joints between cell slabs at both faces of the core, substantial strength and rigidity is imparted to the sandwich structure despite its light weight.

FIGURE 5 illustrates how the method of this invention can be practiced to good advantage in the manufacture of boat hulls. In this instance, the hull, which is generally designated 52 is made in a mold that comprises a substantially deep lower mold part 53 having inner surfaces to define the sides and bottom of the boat hull, and a cover-like upper mold part 54 having an inner surface to define the top wall part or deck of the hull.

The lower body part 55 of the hull is built up in the lower mold portion 53 in the same manner as described previously in connection with the trailer body, terminating the laying up of the outer reinforcement 56, the core forming cell slabs 57, and the inner reinforcement 58 in the same stepped fashion as before, with each in turn spaced a greater distance from the upper edge 59 of the bottom mold portion.

It should be observed that each of the single thickness reinforcements 56 and 58 shown in FIGURES 5 and 6 represent two overlapping laminations of the fiber glass mats such as described previously.

The top wall or deck portion 60 is separately formed in the upper mold part 54 following the method described previously, again terminating the laying down of the outer fiber glass reinforcement 56, the cell slabs 57, and the inner glass fiber reinforcement 58 in stepped fashion, each in turn being spaced a greater distance from the free edge 61 of the mold part 54.

FIGURE 6 shows the corner space which is left for integration of the upper edges of the hull side walls with the adjacent edges of the deck part 60. Such integration is completed in the manner described previously, here however, using spanning cell slabs which are angle shaped to fit the corner portions of the closed mold.

It will be understood, of course, that the integration step of the method is accomplished from inside the hull, to which access is provided by the usual opening 63 in the deck.

In cases where it is easier to coat the entire surfaces of the mold parts, all the way to their outer edges, a mold spacer may be inserted between the mold sections when they are closed preparatory to integrating the body parts. The inner surface of the spacer, of course, would be contoured to provide smooth continuations of the inner surfaces of the mold sections.

FIGURE 7 shows how the core for the hull of FIGURES 5 and 6 may be provided by preformed plastic foam core slabs 65 that increase in thickness toward the bottom of the hull for increased strength. The outer and inner fiber glass reinforcements 66 and 67, respectively, are again provided by laminations comprised of fiber glass mats such as used in the construction of the trailer body initially described.

From the foregoing description taken together with the accompanying drawings, it will be readily apparent to those skilled in the art that the method of this invention enables smooth integration of complementary body parts having walls formed on sandwich construction, without creation of an unsightly bulging joint between the free edges of the body parts, and without sacrificing strength at the juncture of the complementary body parts.

What is claimed as my invention is:

1. The method of making a hollow body having an opening therein and having walls of sandwich construction comprising a core of edgewise adjacent slabs of cellular material confined between and bonded to inner and outer wall forming layers of resin permeated glass fibers, which method comprises:
  (A) separately forming complementary body parts which, in the finished body comprise all of the body except for substantially narrow body wall portions that are integrated with and smoothly connect free edge portions of said complementary body parts to provide continuity between them, proceeding, as to each of said complementary body parts, by
    (1) successively laying down one of said wall forming layers, the core, and then the other wall forming layer, with corresponding layers and the cores of the body parts, at the free edge portions thereof, all stepped an appreciable distance in the same direction, so that the core of each body part terminates at a location intermediate the terminal edges of said layers at the free edge portions of the body parts;
    (2) making each of said wall forming layers by laying down laminae of mats of glass fiber impregnated and saturated with a curing resin, with adjacent laminations of each layer stepped in said direction at the free edge portions of the body part a distance sufficient to expose substantial side surfaces of said laminations;
  (B) holding the complementary body parts in the positions they are to occupy in the finished body; and
  (C) from the side of the body having corresponding wall forming layers spaced apart the greatest distance, integrating the free edge portions of the body parts by
    (1) laying down mats to form successive spanning laminae, upon and in flatwise overlapping relation to the stepped and exposed side surfaces at the end portions of the laminae of the corresponding layers at the other side of the body,
    (2) laying down spanning slabs of cellular core forming material upon said spanning laminae, in close edge to edge relationship with the free edge portions of the core slabs of the body parts,
    (3) and laying down other mats to form successive spanning laminae, upon and in flatwise overlapping relation to the stepped and exposed side surfaces at the end portions of the laminae at the first designated side of the body, with the first lamination thus applied overlying said spanning core slabs.

2. The method of claim 1, wherein each of said body parts is made in a mold having a non-adhering surface; coatings of curing resin are applied to the inner surfaces of the molds just before the fiber glass mats of said first wall forming layers and said spanning laminae are laid therein; and a similar coating of curing resin is applied to the exterior of the fiber glass mats of the other wall forming layers as well as to their spanning laminae.

3. The method of claim 2, wherein the body parts are left in the molds during integration of the body parts, and wherein the molds are utilized to hold the body parts in the positions they are to occupy in the finished body during such integration.

References Cited by the Examiner

UNITED STATES PATENTS

| | | | |
|---|---|---|---|
| 2,672,914 | 3/1954 | Weigold et al. | 156—125 |
| 2,747,180 | 5/1956 | Brucker | 156—242 X |
| 3,068,138 | 12/1962 | Friedman | 156—212 |

FOREIGN PATENTS 505,814  9/1954  Canada.

EARL M. BERGERT, *Primary Examiner.*

HAROLD ANSHER, *Examiner.*